United States Patent

Cross et al.

[11] Patent Number: 5,321,084
[45] Date of Patent: Jun. 14, 1994

[54] BENZIMIDAZOLE-DERIVATIZED AZO COMPOUNDS AND POLYMERS DERIVED THEREFROM FOR NONLINEAR OPTICS

[75] Inventors: Elisa M. Cross, St. Paul; Cecil V. Francis, Woodbury, both of Minn.

[73] Assignee: Minnesota Mining and Manufacturing Company, St. Paul, Minn.

[21] Appl. No.: 89,936

[22] Filed: Jul. 12, 1993

[51] Int. Cl.$^5$ .............................. C08G 18/32
[52] U.S. Cl. ........................ 525/107; 525/123; 525/186; 525/187; 525/204; 525/278; 525/281; 525/455; 525/457; 525/526; 525/528; 525/529; 526/259; 528/73; 548/310.7; 534/800
[58] Field of Search ........... 525/107, 123, 186, 187, 525/204, 278, 281, 455, 457, 526, 528, 529; 526/259; 528/73; 548/325, 330

[56] References Cited

U.S. PATENT DOCUMENTS 4,579,915  4/1986  Choe .................... 525/435
4,886,339  12/1989  Scozzafava et al. ........... 350/96

OTHER PUBLICATIONS

Park et al., *Chem. Mater.*, 2, 229 (1990).
Jin et al., *Chem. Mater.*, 4, 963 (1992).
Chen et al., *Macromolecules*, 24, 5421 (1992) and 25, 4032 (1992).
Müller et al., *Makromol. Chem. Rapid Comm.*, 13, 289 (1992).
Mandal et al., *Makromol. Chem. Rapid Comm.*, 12, 63 (1991).
Yu et al., *Appl. Phys. Lett.*, 60 (14), 1655 (1992).
Eich et al., *J. Appl. Phys.*, 66, 3241 (1992).
Hubbard et al., *Chem. Mater.*, 4, 965 (1992).
Hayashi et al., *Macromolecules*, 25, 5094 (1992).
Xu et al., *Macromolecules*, 25, 6714 (1992).
Preston, *Chem. Rev.*, 74(3), 279 (1974).
Stephens and Bower, *J. Chem. Soc.*, 2971 (1949).
Shi et al., *Appl. Phys. Lett.*, 59, 23 (1991).
Francis et al., *Chem. Mater.*, 5, 506 (1993).

*Primary Examiner*—Maurice J. Welsh
*Attorney, Agent, or Firm*—Gary L. Griswsold; Walter N. Kirn; Lorraine R. Sherman

[57] ABSTRACT

A second order nonlinear optically-active azo monomer comprising a benzimidazole moiety. The monomers can be incorporated into both linear and crosslinked polymers useful in electrooptical devices.

25 Claims, No Drawings

BENZIMIDAZOLE-DERIVATIZED AZO COMPOUNDS AND POLYMERS DERIVED THEREFROM FOR NONLINEAR OPTICS

FIELD OF THE INVENTION

This invention describes new benzimidazole-derivatized nonlinear optically-active azo compounds, and a method of synthesis thereof, from which linear and crosslinked polymers can be synthesized. This invention also describes the incorporation of the polymers into optical devices.

DESCRIPTION OF RELATED ART

Organic optically nonlinear materials can be used in electrooptical switches and modulators. Materials which are optically nonlinear consist of nonlinear optically-active (NLO-active) molecules in a noncentrosymmetric alignment.

To be NLO-active, a molecule must possess a large molecular second-order hyperpolarizability ($\beta$). The most common way to align NLO-active materials is to expose a material in which they are incorporated to an electric field. Any ordering process based on electric field-induced alignment (i.e., poling) requires a large value for the molecular dipole moment ($\mu$). The vector product $\mu \times \beta$ is a measure of the maximum nonlinearity which can be achieved by the ordering process.

For an organic molecule to have a large $\mu \times \beta$ product, it will generally have a delocalized $\pi$-electron system to which both an electron donor group and an electron acceptor group are coupled. Two well-known molecules possessing this set of characteristics are Disperse Red 1 and dimethylaminonitrostilbene (DANS).

These and similar molecules can be incorporated as side chain groups in linear polymers. A major limitation of this type of arrangement is that the noncentrosymmetric alignment necessary for optical nonlinearity ($\chi^{(2)}$), induced by the application of an electric field, tends to relax over time at room or slightly elevated temperatures. This results in a lessening or loss of NLO activity.

Several recent publications have addressed the stability problem through the use of crosslinked polymers. These polymers can be divided into two broad classes. The first of these crosslink around an NLO-active unit, which is attached to the polymer chain at a single point, to restrict the free volume available for relaxation of the NLO-active moiety. Examples of this class include U.S. Pat. No. 4,886,339; Park et al., *Chem. Mater.*, 2, 229 (1990); Jin et al., *Chem. Mater.*, 4, 963 (1992); Chen et al., *Macromolecules*, 24, 5421 (1992) and 25, 4032 (1992); Müller et al., *Makromol. Chem. Rapid Comm.*, 13, 289 (1992); Mandal et al., *Makromol. Chem. Rapid Comm.*, 12, 63–68 (1991); and Yu et al., *Appl. Phys. Lett.*, 14, 1655 (1992). This technique does provide materials with some enhanced second harmonic generator (SHG) stability relative to linear polymers, but the stability of the polar alignment of these materials at elevated temperatures is still poor.

The polymers of the second class are crosslinked through the NLO units themselves. The NLO-active unit is covalently bound to the polymer chain at more than one point. Eich et al., *J. Appl. Phys.*, 66, 3241 (1992) have utilized epoxide chemistry to produce systems in which NLO units were covalently bound at more than one point and which were stable up to 85° C. for a film corona poled at 140° C. for 16 hours). In addition to this rather long curing time, the intrinsic NLO activity of the molecules incorporated in this system was not high, and the films made therefrom were not of optical quality. Additionally, the long-term dimensional stability of the polymer film of this system, especially in high humidity (since amine-cured epoxides are known to have an affinity for water), can be a problem. Hubbard et al., *Chem. Mater.*, 4, 965 (1992) have incorporated a diamino-functional azo dye into epoxy networks but did not achieve a large SHG coefficient. Hayashi et al., *Macromolecules*, 25, 5094 (1992) reported development of a system which is crosslinked by irradiation of azido groups, although the degree of crosslinking obtained was very low. Xu et al., *Macromolecules*, 25, 6714 (1992) have synthesized NLO-active polymers having side chain NLO-active units. Crosslinking was accomplished through the NLO-active units. Although good stability was observed, chromophore density was low due to the fact that the polymers were copolymers.

SUMMARY OF THE INVENTION

Briefly, the present invention provides a second order NLO-active azo compound comprising a benzimidazole moiety.

In another aspect, the present invention provides a second order NLO-active linear polymer comprising at least one second order NLO-active azo group comprising a benzimidazole moiety.

In yet another aspect, the present invention provides a second order NLO-active crosslinked polymer prepared by subjecting either the above second order NLO-active azo compound comprising a benzimidazole moiety or the above second order NLO-active linear polymer to a means for crosslinking, optionally in the presence of a coreactive monomer.

In a still further aspect, the present invention provides a second order NLO-active crosslinked polymer comprising the reaction product of the above second order NLO-active azo compound and a second order NLO-active linear polymer.

In a still further aspect, the present invention provides optical devices comprising any of the second order NLO-active linear and crosslinked polymers of the invention.

In yet another aspect the present invention provides a method of preparing the above second order NLO-active azo monomer, comprising the steps:

(a) providing an aminobenzimidazole, and
(b) diazotizing said aminobenzimidazole.

Methods for preparing homo- and copolymers of the NLO-active azo monomer are also described.

In this application,

"benzimidazole moiety" means a benzimidazole molecule which has been attached, at the 2 position, to another chemical species;

"second order" means any optical or electrooptical process which is dependent upon the square of the magnitude of the electric/optical field;

"external field" means a substantially unidirectional field (usually electrical) applied to a substrate of non-rigid organic molecules in order to induce dipolar alignment of the groups parallel to the field;

"poling" means orienting, in the direction of an external field, the dipole vector of a molecule;

"multifunctional" means having at least two functional groups;

"(meth)acrylate" means acrylate, methacrylate, acrylamide, methacrylamide, and alkyl and aryl compounds which have been substituted with a methacrylate group;

"azlactone" means 2-oxazolin-5-one;

"alkyl" means branched or straight chain organic groups, the longest chain of which comprises from 1 to 20 carbon atoms;

"aryl" means one ring or a fused ring group comprising from 5 to 15 carbon or heteroatoms; and "group" or "moiety" or "compound" means a chemical species that allows for substitution by conventional substituents which do not interfere with the desired product.

The present invention teaches a second order NLO-active azo compound comprising a benzimidazole moiety. This NLO-active compound is both polarizable and noncentrosymmetric.

Functional groups can be incorporated into both the donor and acceptor ends of this compound. Where the reactivities of these functional groups differ, they can be reacted in a stepwise fashion. Reaction of the more reactive functionality with a multifunctional comonomer incorporates the NLO-active molecule into a material (i.e., either a polymer or an oligomer) from which a film can be formed. Further reaction of the other functionality(ies) with the comonomer, in the presence of an external field, results in a crosslinked NLO-active material.

In contrast to the prior art, the present invention teaches an optically nonlinear polymeric material, having a large $\mu \times \beta$ product and good solubility, which can operate for long periods of time at temperatures ranging from $-40°$ to $80°$ C. without significant relaxation.

DETAILED DESCRIPTION OF PREFERRED EMBODIMENTS

The second order NLO-active azo dyes of the present invention comprise a benzimidazole moiety, i.e.,

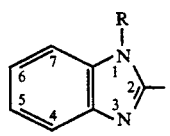

wherein R is selected from the group consisting of hydrogen, alkyl, aryl, alkyl substituted with an active hydrogen-containing group, aryl substituted with an active hydrogen-containing group, groups comprising at least one functionality which is capable of reacting with an active hydrogen-containing group, and (meth)acrylate groups.

The benzene ring of the above structure can be substituted by at least one electron withdrawing group such as nitro, cyano, trifluoromethyl and sulfonyl groups. This group can be located at any of positions 4 through 7 of the benzimidazole moiety.

In the present invention, the above benzimidazole moiety is attached to one end of an azo dye molecule. A particularly preferred embodiment of the second order NLO-active azo dyes of the present invention has the general formula

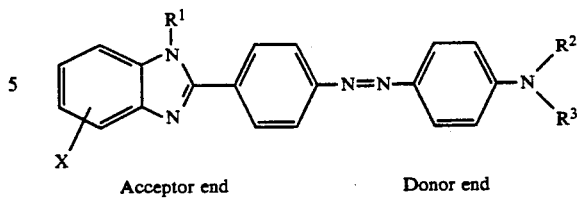

Acceptor end          Donor end wherein $R^1$, $R^2$, and $R^3$ are independently selected from the group consisting of alkyl, aryl, alkyl substituted with an active hydrogen-containing group, aryl substituted with an active hydrogen-containing group, groups comprising at least one functionality which will react with an active hydrogen-containing group, and (meth)acrylates, and X is an electron withdrawing group such as nitro, cyano, trifluoromethyl, and sulfonyl groups, most preferably nitro.

Where at least one of $R^1$, $R^2$, and $R^3$ is a group comprising at least one functionality which will react with an active hydrogen-containing group, it is selected from the group consisting of isocyanates, thioisocyanates, epoxides, azlactones, aziridines, and $\alpha,\beta$-unsaturated groups.

For reasons that will be apparent in the section dealing with the preparation of polymers, it may be desirable that $R^1$ differ from at least one of $R^2$ and $R^3$.

These compounds have large $\mu \times \beta$ products (i.e., greater than $1 \times 10^{-46}$ cm$^6$) and low molar absorbances at wavelengths longer than about 500 nm, are soluble in common organic solvents such as pyridine or dimethylformamide, and are thermally stable from subambient temperatures up to at least 150° C. For integration of optical devices into fiber optic systems (i.e., packaging), stability up to about 250° C. is preferred.

When such dye molecules are reactants in the preparation of crosslinked polymers, multifunctionality is a desirable characteristic. The second order NLO-active azo dyes of the above formula advantageously can have functionalities with differing reactivities which allows them to be reacted in a stepwise fashion. This stepwise reaction mechanism allows the dye molecules to be reacted at either the electron donor or electron acceptor end, poled, and then reacted at the opposite end to form a crosslinked NLO-active polymer.

I. Preparation of Monomers

The synthesis of the benzimidazole-substituted azo dye monomers of the present invention requires the diazotization of an aminobenzimidazole. This involves three basic steps. (The following summary uses a benzimidazole moiety which has been substituted at the 5 position with a nitro group, but those skilled in the art readily will see that other electron withdrawing groups can be used in place of the described nitro group and that the electron withdrawing group can be located at positions other than 5.) First, a substituted 2-amino-5-nitroaniline is prepared. Second, this nitroaniline is reacted with p-acetamidobenzaldehyde to form a benzimidazole intermediate, the amide group of which is then hydrolyzed. Third, the intermediate is reacted with nitrous acid (i.e., sodium nitrite in the presence of an acid) and a substituted aniline to form an azo dye having the desired functionalities. These steps are summarized in the Reaction Scheme shown below. (Each of the reactants described herein are available from a variety of commercial suppliers.)

Reaction Summary

Step 1:

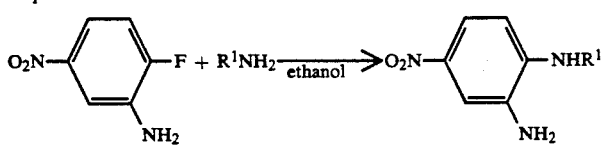

Step 2:

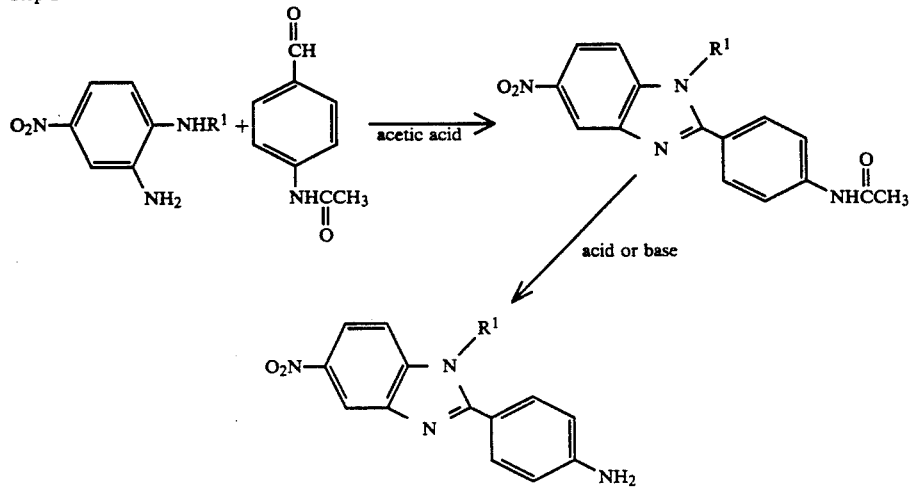

Step 3:

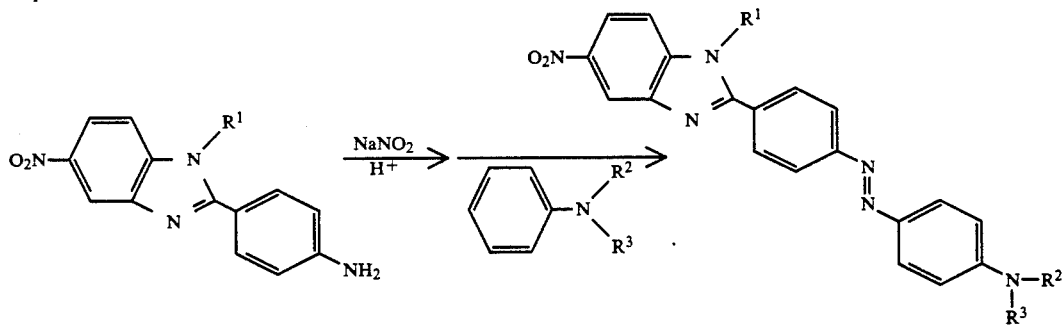

The first step of this scheme involves the reaction of a primary amine with 2-fluoro-5-nitroaniline to produce a substituted 2-amino-5-nitroaniline. Primary amines which can be used in this step include ethanolamine, 1-amino-2-propanol, N-acetylethylenediamine, and ethylene diamine. Where a particular $R^1$ is desired, the corresponding amine must be used.

In the Reaction Summary, 2-fluoro-5-nitroaniline has been used as an exemplary starting material, although other 2-haloanilines can also be used. Other haloanilines which can be used include those substituted at positions 3, 4, 5, or 6 with electron withdrawing groups such as nitro, cyano, and sulfonyl moieties.

If so desired, this step can be carried out in an organic solvent such as ethanol. Additionally, the reaction can be carried out at slightly elevated temperatures (e.g., 40° to 90° C.) in order to decrease reaction time.

More detailed explanation of reaction conditions for this step are given below in Examples 1, 2, and 7.

The second step involves the formation of a benzimidazole intermediate by reacting the above substituted 2-aminonitroaniline with p-acetamidobenzaldehyde. For additional information on this reaction, see Preston, Chem. Rev., 74(3), 279 (1974); and Stephens and Bower, J. Chem. Soc., 2971 (1949). Hydrolysis of the amide group to an amine can be either acid or base catalyzed.

More detailed explanation of reaction conditions for this step are given below in Examples 1, 2, and 7.

The third step is diazotization of the substituted 2-(4'-aminophenyl)benzimidazole and coupling with a substituted aniline. Diazotization is a well known reaction. A full review can be found at, for example, Patai, The Chemistry of Diazonium and Diazo Groups, Wiley & Sons (1978).

As choice of amine in the first step was important because it determined $R^1$, choice of aniline is similarly important because the organic groups attached to the amino nitrogen of the aniline become $R^2$ and $R^3$. For example, where $R^2$ and $R^3$ are both to be —CH(OH)CH$_3$, N,N-bis(2-hydroxypropyl)aniline would be the aniline of choice. Those skilled in the art will appreciate which anilines will provide benzimidazole-derivatized azo dyes having $R^2$ and $R^3$ groups falling within the parameters stated above.

II. Preparation of Polymers

The benzimidazole-derivatized azo dye compounds described above can be incorporated into linear polymers, either as part of the polymer backbone or as a side chain.

Where the benzimidazole-derivatized azo compounds are to be part of the polymer backbone of a linear polymer, they can be homopolymerized or copolymerized with a coreactive monomer. An example of a benzimidazole-derivatized azo compound which can be homopolymerized is a hydroxy-ester monomer. Polycondensation results in an ester interchange upon heating.

Where the benzimidazole-derivatized azo compounds are to be part of a copolymer, a difunctional monomer which is coreactive with a particular benzimidazole-derivatized azo compound may be preferred. For instance, diacid chlorides, diisocyanates, dicarboxylic acids, and diesters can be used in the polymerization of either the bis-hydroxy or the hydroxy-amino versions of the benzimidazole-derivatized azo compound shown in the above Summary. Where the benzimidazole-derivatized azo compound has functionalities which differ, the (difunctional) coreactive monomer will preferably have two different functionalities. For example, a hydroxy-ester benzimidazole-derivatized monomer can be copolymerized with a hydroxy-ester monomer. This ensures that the copolymer has units with dipole moments which are aligned in the same direction. Monomers that are reactive toward various R group combinations will be readily apparent to those skilled in the art and include those comprising (as functionalities) isocyanate, thioisocyanate, epoxide, azlactone, aziridine, and $\alpha,\beta$-unsaturated groups.

Where the benzimidazole-derivatized azo compound of the present invention are to be incorporated into linear polymers as pendant groups, polymerization can occur through $R^2$ and $R^3$ by condensation polymerization with a coreactant. Alternatively, where $R^1$, $R^2$, or $R^3$ is a (meth)acrylate, polymers comprising the benzimidazole-derivatived azo compound as a side chain can be prepared by chain polymerization of the (meth)acrylate group. (Polymerization can also occur through X if it is a sulfonyl group substituted with a (meth)acrylate group.)

Once a polymer is formed, it can be crosslinked, if desired, by subjecting it to any of number of well known means for crosslinking polymers, such as heat, actinic radiation (e.g., where at least one of $R^1$, $R^2$, and $R^3$ is a (meth)acrylate), and application of an external field. Alternatively, crosslinking can occur by reaction, with a coreactive multifunctional monomer, of any of $R^1$, $R^2$, and $R^3$, as long as they still have a free functional group. For example, where the free functional group of one of the R groups is a hydroxyl group, it can be reacted with a multifunctional monomer such as an isocyanate, thioisocyanate, epoxide, azlactone, or aziridine. Compounds comprising an $\alpha,\beta$-unsaturated group might be useful to react with an $R^1$, $R^2$, or $R^3$ functionality comprising, for example, an amine.

No matter which means of crosslinking is chosen, the crosslinking step is performed while the material is being subjected to an external field. This poling ensures that the final material will have molecules with aligned dipoles.

A benzimidazole-derivatized azo compound of the present invention can also be reacted with a multifunctional comonomer to form a crosslinked polymer. Where a crosslinked polymer is desired, the relationship of $R^1$, $R^2$, and $R^3$ depends on the type of coreactant chosen. For instance, where a trifunctional coreactive monomer is used, one of $R^1$, $R^2$, and $R^3$ must be more reactive, preferably much more reactive, than the others. On the other hand, where a difunctional monomer is used, $R^1$, $R^2$, and $R^3$ cannot all be the same; however, in contrast to the trifunctional coreactive monomer situation, two of $R^1$, $R^2$, and $R^3$ can be the same and more reactive than the third. This difference in reactivities allows for a stepwise reaction of the functionalities, i.e., the more reactive of the functionalities will react first and, after the reaction conditions are changed, the other functionality(ies) is/are reacted.

Typical coreactive monomers include isocyanates, thioisocyanates, epoxides, azlactones, aziridines, and $\alpha,\beta$-unsaturated compounds. These coreactive monomers may or may not be NLO-active.

A second order NLO-active linear polymer, preferably comprising at least one second order NLO-active azo group comprising a benzimidazole moiety (described above), can be used in place of the above coreactive monomers where the benzimidazole-derivatized azo group comprises at least two functionalities which are reactive toward at least one functionality of the polymer. Preferably, this second order NLO-active linear polymer comprises a benzimidazole-derivatized azo moiety in each repeat unit so as to maximize the NLO-activity of the crosslinked polymer and can be the polymerization product of at least one of such benzimidazole-derivatized azo monomer and at least one coreactive monomer. (The same coreactive monomers listed above can also be used here.) If the benzimidazole-derivatized azo monomer further comprises a (meth)acrylate group, polymerization can occur through that group.

The crosslinking reaction, which involves attachment of the benzimidazole-derivatized azo group at a second point, is performed as an external field is being applied. This results in a film that is also NLO-active.

The benzimidazole-derivatized azo compounds of the present invention, and polymers derived therefrom, are useful as components in optical devices such as electroptical switches and modulators. Such devices can employ either linear or crosslinked polymers comprising at least one second order NLO-active azo group comprising a benzimidazole moiety.

Objects and advantages of this invention are further illustrated by the following examples. The particular materials and amounts thereof recited in these examples, as well as other conditions and details, should not be construed to unduly limit this invention.

EXAMPLES

Examples 1 to 9 describe the synthesis of benzimidazole-derivatized azo compounds. Unless otherwise noted, "acetic acid" means glacial acetic acid. The products of these examples were confirmed by proton NMR spectroscopy, unless otherwise noted. Completeness of the described reactions was monitored by thin layer chromatography (TLC).

EXAMPLE 1

1-(2'-hydroxypropyl)-2-{4"-[N-(2'"-hydroxyethyl)]-N-ethylamino}-phenylazo-5-nitrobenzimidazole To 20 ml (320 mmole) 1-amino-2-propanol (Aldrich Chemical Co.; Milwaukee, Wis.) was added 4.4 g (280 mmole) 2-fluoro-5-nitroaniline (Aldrich). The mixture was refluxed for approximately 10 minutes and then cooled. Approximately 10 g of ice was added to the mixture. The 2-(2'-hydroxypropyl)amino-5-nitroaniline precipitate was rinsed several times with water and recrystallized from ethanol. Yield was 5 g (85% yield).

To 35 ml acetic acid was added 4.21 g (0.20 mole) of the above product and 3.26 g (0.20 mole) p-acetamidobenzaldehyde (Aldrich). The mixture was refluxed for approximately 16 hours. After the solution cooled to room temperature, 30 ml water was added thereto. The resulting precipitate was filtered, rinsed with water, and transferred to a flask containing 50 ml water, 50 ml ethanol, and 2 g NaOH. The mixture was refluxed for approximately 16 hours. After cooling the solution, ice was added slowly, with stirring, until a yellow precipitate formed. The 1-(2'-hydroxypropyl)-2-(4"-aminophenyl)-5-nitrobenzimidazole product was filtered, rinsed with water, and dried. The yield was 2 g (32% yield).

In 20 ml acetic acid was dissolved 1.98 g (6.6 mmole) of the above product. To this solution was added 20 ml ice water, and the beaker was cooled in an ice bath,. In 5 ml water was dissolved 0.44 g (6.4 mmole) sodium nitrite, and this second solution was added to the first to form the diazonium salt. In 5 ml acetic acid was dissolved 1.1 g (6.6 mmole) 2-(N-ethylanilino)ethanol (Aldrich), and this third solution was added to the diazo compound mixture. The resulting solution immediately turned dark red. This solution was poured into 500 ml ice. The resulting orange precipitate was collected and rinsed with water. The yield was 3 g (98% yield). The product, having the formula shown below, was further purified by column chromatography in ethyl acetate/acetone.

precipitate was collected, rinsed several times with water and recrystallized from ethanol. Yield was 3.2 g (85% yield).

To 35 ml acetic acid was added 21.1 g (110 mmole) of the above product and 17.3 g (110 mmole) p-acetamidobenzaldehyde. This mixture was refluxed for approximately 16 hours. After this solution cooled, approximately 100 ml water was added until a precipitate formed. This precipitate was filtered, rinsed with water, and dissolved in a mixture of 100 ml ethanol, 100 ml water, and 4 g NaOH. The solution was refluxed for about 16 hours and then cooled. Ice was added slowly until a yellow solid began to precipitate. The 1-(2'-hydroxyethyl)-2-(4"-aminophenyl)-5-nitrobenzimidazole was filtered, rinsed with water, and dried. Yield was 17.5 g (55% yield).

In 20 ml acetic acid Was dissolved 1.1 g (3.9 mmole) of the above product. Before cooling this solution in an ice bath, 20 ml ice water was added. In 5 ml water was dissolved 0.44 g (6.4 mmole) sodium nitrite, and this second solution was added to the first. In 5 ml acetic acid was dissolved 0.77 g (3.9 mmole) N,N-bis(2-hydroxypropyl)aniline (TCI America; Portland, Oreg.), and this third solution was added to the diazo solution. The resulting solution immediately turned dark red. This solution was poured into 300 ml ice water. The resulting orange precipitate was collected and rinsed with water. The yield was 1.5 g (79% yield). The structure of this compound is shown below.

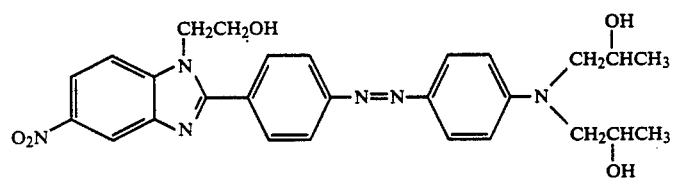

EXAMPLE 3:

1-(2'-hydroxyethyl)-2-{4"-[N-(2'"-aminoethyl)-N-ethylamino]}phenylazo-5-nitrobenzimidazole A mixture of 50.0 g (413 mmole) N-ethylaniline (Aldrich), 50.1 g (413 mmole) N-(2-chloroethyl)acetamide (Aldrich), 57 g (413 mmole) potassium carbonate (Aldrich), and 100 ml N-butanol (Aldrich) was refluxed under nitrogen atmosphere, with stirring, for five days. After cooling and filtering, the N-butanol was evaporated under reduced pressure to give a brown oil. This oil was purified by column chromatography on silica gel (using dichloromethane as eluent) to give a white solid. The yield of N-ethyl-N-(2-acetamidoethyl)aniline was 65%.

A solution of 30 g (0.15 mole) of the product from the above paragraph, 45 ml concentrated HCl, and 230 ml distilled water was refluxed for three days. The mixture was cooled, concentrated, made alkaline with a 10% NaOH solution, and extracted with chloroform. The

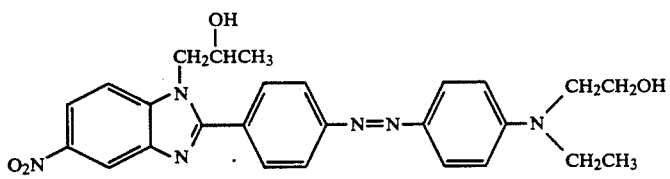

EXAMPLE 2

1-(2'-hydroxyethyl)-2-[4"-bis(2'"-hydroxypropyl)amino]phenylazo-5-nitrobenzimidazole To 20 ml (320 mmole) ethanolamine (Aldrich) was added 3 g (190 mmole) 2-fluoro-5-nitroaniline (Adrich). The mixture was refluxed for 20 minutes and then cooled. Approximately 10 g of ice was added to the mixture. The 2-(2,-hydroxyethyl)amino-5-nitroaniline extract was dried over anhydrous MgSO₄ and concentrated under reduced pressure to give a light yellow oil. The oil was purified under reduced pressure to give a colorless to light yellow oil. The yield of N-ethyl-N-(2-aminoethyl)aniline was 80%.

In 20 ml acetic acid was dissolved 2.40 g (8.0 mmole) 1-(2'-hydroxyethyl)-2-(4''-aminophenyl)-5-nitrobenzimidazole (from Example 2). To this solution was added 20 ml ice water before the flask was cooled in an ice bath. A second solution of 0.6 g (9 mmole) sodium nitrite in 10 ml water was added. Thereafter, 0.5 ml of the product from the above paragraph was added dropwise. Although the solution turned a dark red color, no precipitate formed upon addition of 200 ml ice water. After reducing the solution on a rotoevaporator, the residue was dissolved in 30 ml ethanol. An orange precipitate formed when the ethanol solution was cooled in an acetone/dry ice bath. The 1-(2'-hydroxyethyl)-2{4''-[N-(2'''-aminoethyl)-N-ethylamino]}phenylazo-5 -nitrobenzimidazole product was collected and rinsed with very cold ethanol. The yield was 1.6 g (56% yield). The structure of this compound is shown below.

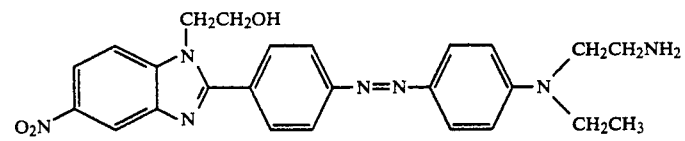

EXAMPLE 4

1-(2'-hydroxyethyl)-2-{4''-[N-(2'''-propionomidoethyl)-N-ethylamino]}phenylazo-5 -nitrobenzimidazole In 10 ml acetic acid was dissolved 1.48 g (4.9 mmole) 1-(2'-hydroxyethyl)-2-(4''-aminophenyl)-5-nitrobenzimidazole (from Example 2). To this solution was added 10 ml ice water before the flask was cooled in an ice bath. A second solution of 0.41 g (5.9 mmole) sodium nitrite in 10 ml water was added. Thereafter, 1.10 g (4.9 mmole) of N-ethyl-N-(2-propionomidoethyl) aniline prepared according to the procedure of Fazio, *J. Org. Chem.* 49, 4889 (1984) was added dropwise. A dark red color formed immediately. After the addition of 30 ml water, an oily precipitate formed. The majority of the liquid was decanted, and the oily substance was triturated with water and collected. The yield was 2.06 g (83% yield). The chemical structure of 1-(2'-hydroxyethyl)-2-{4''-[N-2'''-propionamidoethyl-N-ethylamino]}phenyl-azo-5-benzimidazole is shown below.

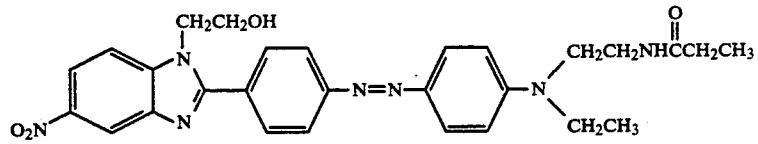

EXAMPLE 5

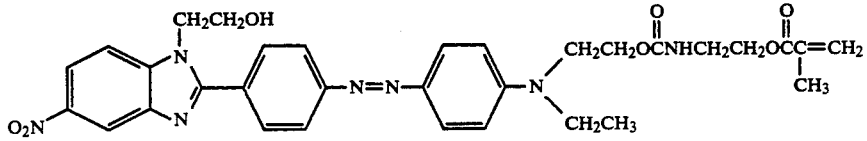

To 125 ml dry pyridine was added 31.1 g (180 mmole) 2-(N-ethylanalino)ethanol (Aldrich) and 29 ml (180 mmole) isocyanatoethylmethacrylate (Dow Chem. Co.; Midland, Mich.). Catalytic amounts of triethylenediamine (Aldrich) and dibutyltin dilaurate (Aldrich) were added to this solution, which then became warm. Once the reaction was complete, the pyridine was removed by a rotoevaporator. Ethanol was added to the remaining solution, which was then cooled in an ice bath. Because no precipitate formed, ethanol was removed in order to isolate the oil. Yield was 55 g (92% yield).

In 30 ml acetic acid was dissolved 5.0 g (17 mmole) 1-2'-hydroxyethyl)-2-(4''-aminophenyl)-5-nitrobenzimidazole) (from Example 2). To this solution was added 30 ml ice water before the flask was cooled in an ice bath. A second solution of 1.2 g (18 mmole) sodium nitrite in 20 ml water was added. Thereafter, 5.38 g (3.0 mmole) of the above oil was added dropwise. A dark red color formed immediately. The solution was poured into 200 ml ice water. The red precipitate was collected and rinsed with water. The yield was 7.7. g (74% yield).

EXAMPLE 6

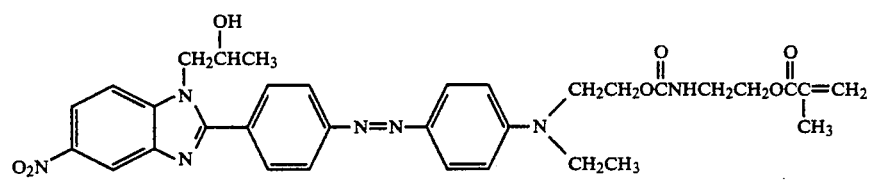

Following the procedure of Example 5, 3.74 g (12 mmole) 1-(2'-hydroxypropyl)-2-(4''-aminophenyl)-5-nitrobenzimidazole (from Example 1) was reacted with 0.83 g (12 mmole) sodium nitrite and 3.8 g (12 mmole) of the oil from Example 5. Yield was 5.9 g (73% yield).

EXAMPLE 7

1-(2'-aminoethyl)-2-{4''-[N-(2'''-hydroxyethyl)-N-ethylamino]}phenylazo-5 -nitrobenzimidazole A solution of 100 g (0.641 mole) 2-fluoro-5-nitroaniline in 150 g (2.5 mole) ethylenediamine and 350 ml ethanol was refluxed for approximately 16 hours. The hot solution was filtered to remove the ethanol-insoluble side product. The filtrate was cooled, and the 2'-aminoethylamino-5-nitroaniline precipitate was collected and rinsed with ethanol. Yield was 89 g (68% yield).

A solution of 20.6 g (0.105 mole) of the product of the above paragraph and 16.6 g (0.102 mole) p-acetamidobenzaldehyde in 100 ml acetic acid was refluxed for approximately 16 hours. The solution was cooled and water was added until a precipitate formed. A yellow solid, spectroscopically confirmed as 1-(2'-acetamidoethyl)-2-(4''-acetamidophenyl)-5 -nitrobenzimidazole, was collected and rinsed with water. (Yield was 21.47 g, 57%). A 7.5 g (20 mmole) portion of this solid was added to a mixture of 40 ml water, 10 ml concentrated HCl, and 20 ml ethanol, and the solution was refluxed for approximately 16 hours. After the solution cooled, a 1.0M NaOH solution was used to neutralize the pH. A dark yellow precipitate was filtered and rinsed in water. Yield of 1-(2'-aminoethyl)-2-(4''-aminophenyl)-5-nitrobenzimidazole was 4.5 g (72%).

In 200 ml concentrated HCl was dissolved 30.47 g (approximately 0.1 mole) of the product from the above paragraph (produced on a larger scale). To this solution was added 200 ml ice water, and the flask was cooled in an ice bath. A second solution of 7.3 g (0.105 mole) sodium nitrite in 50 ml water was added slowly to the first solution while the temperature was kept below 10° C. To the resulting solution was added a third solution of 16.98 g (0.10 mole) 2-(N-ethylanilino)ethanol (Aldrich) in 50 ml ethanol. The purple solution was then poured into 200 ml ice water and neutralized with 2 N NaOH solution, while ice was added as required to keep the temperature below 10° C. As the pH was neutralized, an orange precipitate formed. The solid was added to 600 ml ethanol and this slurry was heated to reflux. The ethanol-insoluble product was collected and rinsed several times with hot ethanol. Yield was 38 g (78% yield). The structure of this compound is shown below.

EXAMPLE 8

1-(2'-hydroxypropyl)-2-{4''-[N-(2'''-methacroyloxyethyl)-N-ethylamino]}phenylazo-5 -nitrobenzimidazole In 75 ml dry pyridine was dissolved 26.6 g (150 mmole) 2-(N-ethylanilino)ethanol. To this solution was added 28 ml methacrylic anhydride (Aldrich) and a catalytic amount of 4-dimethylaminopyridine (Aldrich). This solution was refluxed until the reaction was complete (approximately 30 minutes). Excess pyridine was removed by a rotoevaporator. The residue was dissolved in ethyl acetate and thrice extracted with a 1M NaHCO₃ solution, dried over magnesium sulfate, and reduced. The yield of N-ethyl-N-(2-methacryloyloxyethyl)aniline was 30.1 g (80% yield).

In 50 ml acetic acid was dissolved 10 g (31 mmole) 1-(2'-hydroxypropyl)-2-(4''-aminophenyl)-5-nitrobenzimidazole (from Example 1). To this solution was added 50 ml ice water, and the flask was cooled in an ice bath. A second solution of 2.20 g (32 mmole) sodium nitrite in 20 ml water was added to the first. Thereafter, a solution of 7.3 g (31 mmole) of the product from the preceding paragraph in 20 ml acetic acid, which was cooled to 5° C., was added to the other solution. The red precipitate which formed immediately was collected and rinsed with water. The 1-(2'-hydroxypropyl)-2-{4''-[N-(2'''-methacryloyloxyethyl)-N-ethylamino]}phenylazo-5 -nitrobenzimidazole product was recrystallized from ethanol. The yield was 7 g (41% yield). The structure of this compound is shown below.

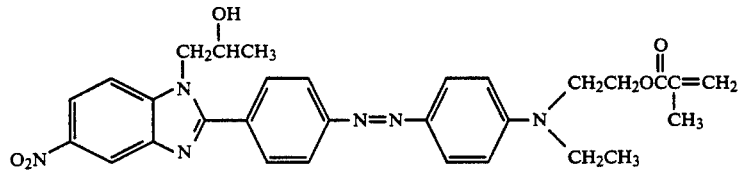

EXAMPLE 9

1-(2'-hydroxypropyl)-2-{4''-[N,N-bis(2'''-hydroxypropyl)]}phenylazo-5 -nitrobenzimidazole In 50 ml acetic acid was dissolved 18.17 g (58 mmole) 1-(2'-hydroxypropyl)-2-(4''-aminophenyl)-5-nitrobenzimidazole (from Example 1). To this solution was added 50 ml ice water, and the flask was cooled in an ice bath. A second solution of 4.20 g (31 mmole) sodium nitrite in 20 ml water was added to the first Thereafter, a solution of 11.9 g (60 mmole) N,N-bis(2-hydroxypropyl)aniline (CTC Organics, Inc.; Atlanta, Ga.) in 50 ml acetic acid, which was cooled to 5° C., was added to the other solution. The combined solution was poured into 300 ml ice water. The red precipitate which formed immediately was collected and rinsed with water. The red precipitate was identified as 1-(2'-hydroxypropyl)-2-(4''-[N,N-bis(2'''-hydroxypropyl) ]}-phenylazo-5-nitrobenzimidazole and was purified by column chro-

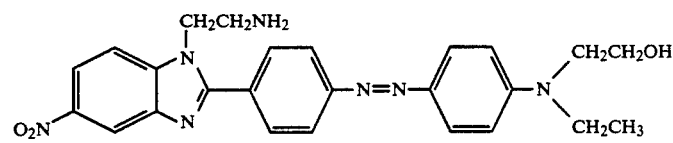

matography. The yield was 15.5 g (50% yield). The structure of this compound is shown below.

yl]ethyl-N-isopropyl )-2-amino]ethyl}amine, the structure of which was confirmed by spectroscopic analysis

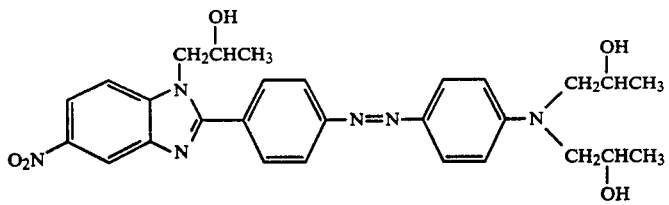

Examples 10 and 11 describe the poling and crosslinking of difunctional benzimidazole-derivatized azo dyes into polymeric networks.

EXAMPLE 10

Dye from Example 7 in an Isocyanate Network

To 2.5 ml dry pyridine containing 0.5 g Tolonate TM HDT (hexamethylene diisocyanate trimer) (Rhone-Poulenc, Inc.; Princeton, N.J.) was added 0.58 g of the dye from Example 7. This solution was heated at 50° C. for approximately an hour. A film having a thickness of 2.1 μm was formed by spin coating (at 2000 rpm for 30 sec) onto a glass slide having indium-tin (ITO) electrodes. A 90 Å-layer of gold was vapor deposited onto this film to serve as the top electrode.

This sample was placed in an oven and cured at 150° C. for 90 minutes while an electric field of 1 Mv/cm was applied. (Subsequent infrared spectroscopy showed that all isocyanate had reacted.) Thereafter, the sample was allowed to cool to room temperature (approximately an hour), at which time the electric field was removed. The sample was then placed in a dessicator for two days. The gold coating was removed with a potassium iodide solution. ITO was sputter coated onto the film.

Measurement of $d_{33}$, as described in Fransis et al., Chem. Mater., 5, 506 (1993), gave a value of 12.3 pm/V; thus, the $r_{33}$ was estimated to be 6.6 pm/V.

EXAMPLE 11

Dye from Example 7 in an Azlactone Network

A mixture of 50 g tris(2-aminoethyl)amine (W. R. Grace and Co.; Lexington, Mass.), 100 ml acetone, 25 ml ethanol, and 0.5 g platinum oxide (Aldrich) was combined in a 500 ml pressure bottle which was hydrogenated, at 50 PSIG for about 24 hours, on a pressure reaction apparatus (Parr Instrument Co., Inc.; Moline, Ill.). Catalyst was removed by filtration, and solvent was removed under reduced pressure. The residue was distilled (b.p.=113-115° C. at 1-2 mm Hg) to afford tris(N-isopropyl-2-aminoethyl)amine, the structure of which was confirmed by NMR and IR spectroscopy.

To the above product was added 3 molar equivalents of vinyldimethyl azlactone (SNPE; Princeton, N.J.). This mixture was heated at 65° C. for about 18 hours to provide tris{[2-(N-2-[4,4-dimethyl-2-oxazolin-5-one-2-yl]ethyl-N-isopropyl )-2-amino]ethyl}amine, the structure of which was confirmed by spectroscopic analysis To 0.34 g of the trisazlactone from the above paragraph dissolved in 1.5 g dry pyridine was added 0 0.24 g of the dye from Example 7. The solution was warmed at 100° C. for about eight hours, and the progress of the reaction was monitored by infrared spectroscopy (i.e., diminution of the band at 1815 cm$^{-1}$ from the lactone ring). The solution was filtered and spin coated on glass slides. These slides were heated, under dry nitrogen, at 150° C. until an insoluble film formed.

Examples 12 to 14 describe the incorporation of difunctionalized benzimidazole-derivatized azo dyes into linear polymers.

EXAMPLE 12

Incorporation of Dye from Example 5

In a 50 ml round bottom flask containing a magnetic stirrer was combined 20 ml dry N-methylpyrolidinone (Aldrich) and 8.13 g of the dye of Example 5. To this solution was added 0.35 g (2.1 mmole) 2,2'-azobisisobutyronitrile. The flask was fitted with a reflux condenser, purged with nitrogen for 15 minutes, and placed in an 80° C. oil bath. The mixture was allowed to stir, under a nitrogen atmosphere, for two hours. Thereafter, the orange polymer was precipitated in cold ethanol and collected. The product was rinsed with ethanol until the washings were colorless. Yield was 7.6 g (76% yield).

Gel permeation chromatography using polystyrene standards showed that the polymer had a weight average molecular weight ($M_w$) of 354,000 and a number average molecular weight ($M_n$) of 54,645. Differential scanning calorimetry (DSC) showed that its glass transition temperature ($T_g$) was 138° C. The structure shown below was confirmed by NMR spectroscopy.

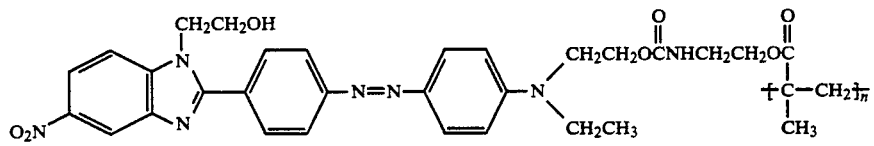

EXAMPLE 13

Incorporation of Dye from Example 6

In a 100 ml round bottom flask containing a magnetic stirrer was combined 40 ml dry N-methylpyrolidinone and 3.15 g of the dye of Example 6. To this solution was added 0.15 g (0.90 mmole) 2,2'-azobisisobutyronitrile. The flask was fitted with a reflux condenser, purged with nitrogen for 15 minutes, and placed in an 80° C. oil bath. The mixture was allowed to stir overnight under a nitrogen atmosphere. Thereafter, the orange polymer was precipitated in cold ethanol and collected. The product was rinsed with ethanol until the washings were colorless. The yield was 1.7 g (54% yield).

Gel permeation chromatography using polystyrene standards showed that the polymer had a $M_w$ of 36,000 and a $M_n$ of 21,200. DSC showed that its glass transition temperature ($T_g$) was 128° C. The structure shown below was confirmed by NMR spectroscopy.

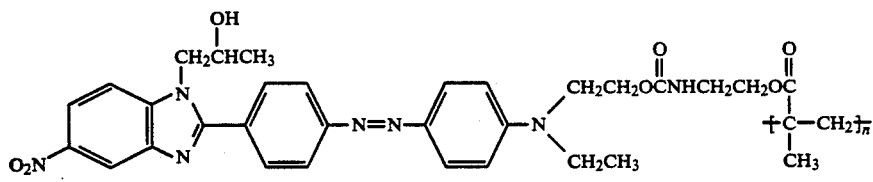

EXAMPLE 14

Incorporation of Dye from Example 8

In a 100 ml round bottom flask containing a magnetic stirrer was combined 40 ml dry N-methylpyrolidinone and 5.97 g of the dye of Example 8. To this solution was added 0.30 g (1.8 mmole) 2,2'-azobisisobutyronitrile. The flask was fitted with a reflux condenser, purged with nitrogen for 15 minutes, and placed in an 80° C. oil bath. The mixture was allowed to stir overnight under a nitrogen atmosphere. Thereafter, the orange polymer was precipitated in cold ethanol and collected. The product was rinsed with ethanol until the washings were colorless. The yield was 4.97 g (83% yield).

Gel permeation chromatography using polystyrene standards showed that the polymer had a $M_w$ of 40,000 and a $M_n$ of 20,000. DSC showed that its glass transition temperature ($T_g$) was 151° C. The structure shown below was confirmed by NMR spectroscopy.

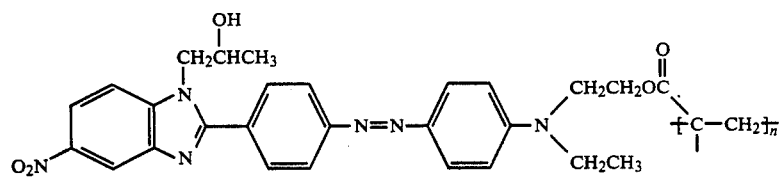

Various modifications and alterations of this invention which do not depart from the scope and spirit of this invention will become apparent to those skilled in the art. This invention is not to be unduly limited to the illustrative embodiments set forth herein.

We claim:

1. A second order nonlinear optically-active azo compound comprising a benzimidazole moiety.

2. The second order nonlinear optically-active azo compound of claim 1 wherein the 6-membered ring of said benzimidazole moiety is substituted with an electron withdrawing group.

3. The second order nonlinear optically-active azo compound of claim 2 having the formula

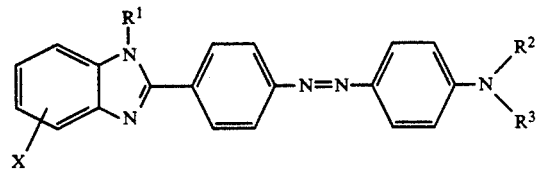

wherein $R^1$, $R^2$, and $R^3$ are independently selected from the group consisting of alkyl, aryl, alkyl substituted with an active hydrogen-containing group, aryl substituted with an active hydrogen-containing group, groups comprising at least one functionality which will react with an active hydrogen-containing group, and (meth)acrylates; and X is an electron withdrawing group.

4. The second order nonlinear optically-active azo compound of claim 3 wherein said electron withdrawing group is selected from the group consisting of nitro, cyano, trifluoromethyl, and sulfonyl groups.

5. The second order nonlinear optically-active azo compound of claim 4 wherein said electron withdrawing group is a nitro group.

6. The second order nonlinear optically-active azo compound of claim 3 wherein said group comprising at least one functionality which will react with an active hydrogen-containing group is selected from the group consisting of isocyanates, thioisocyanates, azlactones, epoxides, aziridines, and $\alpha,\beta$-unsaturated groups.

7. The second order nonlinear optically-active azo compound of claim 3 wherein $R^1$ differs from at least one of $R^2$ and $R^3$.

8. A second order nonlinear optically-active linear polymer comprising at least one second order nonlinear optically-active azo group comprising a benzimidazole moiety.

9. The second order nonlinear optically-active linear polymer of claim 8 wherein said linear polymer is the polymerization product of at least one second order nonlinear optically-active azo compound comprising a benzimidazole moiety and at least one coreactive monomer.

10. The second order nonlinear optically-active linear polymer of claim 9 wherein said at least one coreactive monomer is selected from the group consisting of isocyanates, thioisocyanates, epoxides, azlactones, aziridines, and $\alpha,\beta$-unsaturated compounds.

11. The second order nonlinear optically-active linear polymer of claim 8 wherein said linear polymer is the chain polymerization product of a second order nonlinear optically-active azo compound comprising a benzimidazole moiety and a (meth)acrylate group.

12. A second order nonlinear optically-active crosslinked polymer prepared by subjecting the linear polymer of claim 8 to a means for crosslinking linear polymers.

13. The second order nonlinear optically-active crosslinking means is at least one of actinic radiation, heat, application of an external field, and reaction with a coreactive multifunctional monomer.

14. A second order nonlinear optically-active crosslinked polymer comprising the polymerization product of the compound of claim 1 and at least one coreactive monomer.

15. The crosslinked polymer of claim 14 wherein said coreactive monomer is selected from the group consisting of isocyanates, thioisocyanates, epoxides, azlactones, aziridines, and α,β-unsaturated compounds.

16. A second order nonlinear optically-active crosslinked polymer comprising the reaction product of
   a) the second order nonlinear optically-active azo compound of claim 1, and
   b) a second order nonlinear optically-active linear polymer.

17. The second order nonlinear optically-active crosslinked polymer of claim 16 wherein said second order nonlinear optically-active linear polymer comprises at least one second order nonlinear optically-active azo compound comprising a benzimidazole moiety.

18. The second order nonlinear optically-active crosslinked polymer of claim 17 wherein said second order nonlinear optically-active linear polymer comprises the polymerization product of at least one second order nonlinear optically-active azo compound comprising a benzimidazole moiety and at least one coreactive monomer.

19. The second order nonlinear optically-active crosslinked polymer of claim 18 wherein said at least one coreactive monomer is selected from the group consisting of isocyanates, thioisocyanates, epoxides, azlactones, aziridines, and α,β-unsaturated compounds.

20. The second order nonlinear optically-active crosslinked polymer of claim 17 wherein said linear polymer is the chain polymerization product of a second order nonlinear optically-active azo compound comprising a benzimidazole moiety and a (meth)acrylate group.

21. An optical device comprising the linear polymer of claim 8.

22. An optical device comprising the crosslinked polymer of claim 12.

23. An optical device comprising the crosslinked polymer of claim 14.

24. An optical device comprising the crosslinked polymer of claim 16.

25. A method of preparing the second order nonlinear optically-active azo compound of claim 1, comprising the steps:
   (a) providing an aminobenzimidazole, and
   (b) diazotizing said aminobenzimidazole.

* * * * *

UNITED STATES PATENT AND TRADEMARK OFFICE
CERTIFICATE OF CORRECTION

PATENT NO. : 5,321,084
DATED : June 14, 1994
INVENTOR(S) : Elise M. Cross and Cecil V. Francis It is certified that error appears in the above-indentified patent and that said Letters Patent is hereby corrected as shown below:

| | |
|---|---|
| Col. 1, line 50 | "2,229" should read -- 2, 229 -- |
| Col. 1, line 67 | Insert a "(" before the word "for" |
| Col. 9, line 4 | Delete the space between the "5" and the "-" |
| Col. 9, line 68 | "2-(2,-hydroxyethyl)amino-5-nitroaniline" should read -- 2-(2'-hydroxyethyl)amino-5-nitroaniline -- |
| Col. 10, line 42 | Delete the space between the "5" and the "-" |
| Col. 11, line 46 | "-propionomidoethyl)-" should read -- -propionamidoethyl)- -- |
| Col. 11, line 64, | "-propionomidoethy)" should read -- -propionamidoethyl)- -- |
| Col. 12, line 24 | "2-(N-ethylanalino)ethanol" should read -- 2-(N-ethylanilino)ethanol -- |
| Col. 13, line 6 | Delete the space beween the "5" and the "-" |
| Col. 13, line 17 | "p-" should read -- *p*- -- |
| Col. 13, line 22 | Delete the spaces between the "5" and the "-" |
| Col. 14, line 4 | Delete the spaces between the "5" and the "-" |

UNITED STATES PATENT AND TRADEMARK OFFICE
CERTIFICATE OF CORRECTION

PATENT NO. : 5,321,084
DATED : June 14, 1994
INVENTOR(S) : Elise M. Cross and Cecil V. Francis It is certified that error appears in the above-indentified patent and that said Letters Patent is hereby corrected as shown below:

Col. 14, line 45  Delete the spaces between the "5" and the "-"

Col. 14, line 59, "2-(4'''-[N,N-bis('''-hydroxypropyl) ] } -phenylazo-5-" should read -- 2-(4'''-[N,N-bis(2'''-hydroxypropyl] } -phenylazo-5- --

Col. 16, line 1   "yl]ethyl-N-isopropyl )-2-amino]ethyl}amine," should read

-- yl]ethyl-N-isopropyl)-2-amino]ethyl}amine, --

Col. 16, line 2   insert "." at end of line

Col. 16, line 15  "0 0.24" should read -- 0.24 --

Col. 18, line 67  at end of line insert "crosslinked polymer of claim 12 wherein said"

Signed and Sealed this

Twenty-ninth Day of November, 1994

Attest:

BRUCE LEHMAN

Attesting Officer

Commissioner of Patents and Trademarks